US007691175B2

(12) United States Patent
Shimoda et al.

(10) Patent No.: US 7,691,175 B2
(45) Date of Patent: Apr. 6, 2010

(54) GRANULAR METAL POWDER

(75) Inventors: Kohei Shimoda, Osaka (JP); Issei Okada, Osaki (JP); Masatoshi Majima, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 162 days.

(21) Appl. No.: 10/575,898

(22) PCT Filed: Jun. 24, 2004

(86) PCT No.: PCT/JP2004/009309

§ 371 (c)(1),
(2), (4) Date: Apr. 14, 2006

(87) PCT Pub. No.: WO2005/037464

PCT Pub. Date: Apr. 28, 2005

(65) Prior Publication Data

US 2007/0074598 A1 Apr. 5, 2007

(30) Foreign Application Priority Data

Oct. 15, 2003 (JP) ............................ 2003-354459

(51) Int. Cl.
*B22F 1/00* (2006.01)
*B22F 9/24* (2006.01)

(52) U.S. Cl. ........................................ 75/255; 252/514

(58) Field of Classification Search .................. 75/252, 75/255; 252/500-521.6
See application file for complete search history.

(56) References Cited

U.S. PATENT DOCUMENTS 3,617,253 A * 11/1971 Amiet ......................... 419/23
4,212,736 A * 7/1980 Dunkley ..................... 210/804
5,590,387 A * 12/1996 Schmidt et al. ............... 419/36
6,136,228 A * 10/2000 Hirai et al. .................. 252/512
6,190,578 B1 * 2/2001 Yokoyama et al. .......... 252/512
2002/0018896 A1 2/2002 Fukunaga et al.
2002/0108469 A1 8/2002 Behrens
2003/0178604 A1 9/2003 Okada et al.
2007/0068341 A1 * 3/2007 Cheng et al. .................. 75/255
2007/0262481 A1 * 11/2007 Watano ......................... 264/9

FOREIGN PATENT DOCUMENTS

| | | | |
|---|---|---|---|
| EP | 1 175 948 | A2 | 1/2002 |
| JP | 7-232965 | A | 9/1995 |
| JP | 11-80647 | A | 3/1999 |
| JP | 11-310804 | A | 11/1999 |
| JP | 2001-35255 | A | 2/2001 |
| JP | 2002-256308 | A | 9/2002 |
| TW | 406062 | | 9/2000 |

OTHER PUBLICATIONS

T. Moritz and A. Nagy. Preparation of super soft granulate from nanosized ceramic powders by spray freezing. Journal of Nanoparticle Research, vol. 4, (2002), p. 439-448.*
K. Sommer. "Size Enlargement". In Ullmann's Encyclopedia of Industrial Chemistry. Jun. 15, 2000, p. 1-15 and 37-40.*
European Search Report issued in corresponding European Patent Application No. EP 04746778.2-2122, dated Oct. 12, 2007.
Taiwanese Notification for the Opinion of the Examination, w/ English translation thereof, issued in Taiwanese Patent Application No. TW 93119253 dated Jul. 1, 2009.

* cited by examiner

*Primary Examiner*—George Wyszomierski
*Assistant Examiner*—Mark L Shevin
(74) *Attorney, Agent, or Firm*—McDermott Will & Emery LLP

(57) ABSTRACT

When fine metal particles of a nanometer size are handled in a state of colloidal particles, it is difficult to handle them and the range of the selection of the solvent to be used is limited. The invention offers a granular metal powder that is produced by the steps of (a) preparing a suspension liquid comprising (a1) water, an organic solvent, or a mixture thereof, (a2) metal particles having an average particle diameter of at least 1 nm and at most 100 nm, and (a3) an organic compound capable of being adsorbed on the surface of the metal particles and (b) removing the water, organic solvent, or mixture thereof by drying the suspension liquid and that has an apparent density of at least 1.0 g/ml and at most 5.0 g/ml. The granular metal powder can be handled as a dry metal powder and is readily redispersed in a solvent.

6 Claims, No Drawings

GRANULAR METAL POWDER

RELATED APPLICATIONS

This application is the U.S. National Phase under 35 U.S.C. § 371 of International Application No. PCT/JP2004/009309, filed on Jun. 24, 2004, which in turn claims the benefit of Japanese Application No. 2003-354459, filed on Oct. 15, 2003, the disclosures of which Applications are incorporated by reference herein.

TECHNICAL FIELD

The present invention relates to a granular metal powder that is produced by improving a metal power widely used not only in a conductivity-imparting material for imparting conductivity to rubber, resin, adhesive, and so on but also in a conductive wiring material such as conductive paste and in a catalytic material, for example.

BACKGROUND ART

In recent years, researchers and engineers have been widely studying the creation of materials that significantly improve the function and property and that exhibit new function and property. For this purpose, they exploit the nanotechnology that controls the process for synthesizing particles at a nanometer ($10^{-9}$ m) level. In the case of metal particles, it has been widely known that when the particle size is reduced, the dependency of the physical property of the particles changes from the volume dependency to the surface-area dependency, thereby changing the catalytic activity, the sintering temperature (which is reduced), and other physical properties. When the particle diameter of metal particles is reduced to below submicron, i.e., to a nanometer level, unique functions that cannot be obtained in a bulk state are manifested in properties, such as not only the above-described catalytic activity and sintering temperature (which is reduced) but also magnetic property, optical property, detection of specific genes, and coloring. Consequently, nanometer-size metal particles attract particular attention as a functional material.

However, as the particle diameter of metal particles is decreased to a nanometer size, the van der waals force between the metal particles increases, aggravating the problem of the intensification of the particle agglomeration. To cope with the agglomeration, a measure is usually employed in which the surface of the particles is coated with a dispersant that suppresses the agglomeration. Nevertheless, when the diameter of the particles is decreased to a nanometer size, the agglomerative force becomes excessively strong, creating a problem in that the redispersion becomes difficult. Furthermore, when the distance between the metal particles is increased to prevent the agglomeration, although the agglomeration can be decreased without failure, other problems are created in the handling such as weighing, transferring, and packing.

As a result, fine metal particles having a nanometer-size particle diameter have been usually supplied in the form of a colloidal dispersion solution. Examples of this technique have been disclosed in the published Japanese patent applications Tokukaihei 11-80647 and Tokukai 2001-35255.

On the other hand, when metal particles are combined with other material such as resin and adhesive, it is generally desirable that the metal particles be used in a dry state because of the following reasons: first, the control of the adding amount is easy and, second, when a dispersion medium such as water or organic solvent is used, it may adversely affect the composite material using resin, adhesive, and the like. Consequently, a dry powder superior in handling and redispersion has been awaited.

DISCLOSURE OF THE INVENTION

The present invention relates to a metal power widely used not only in a conductivity-imparting material for imparting conductivity to rubber, resin, adhesive, and so on but also in a conductive wiring material such as conductive paste and in a catalytic material, for example. An object of the present invention is to offer a metal powder that is a granular dry powder composed mainly of fine metal particles of a nanometer size, that is superior in handling, and that can be easily redispersed.

The present invention offers a granular metal powder that (a) is produced by the steps of (a1) preparing a solution comprising (a1a) water, an organic solvent, or a mixture of them, (a1b) metal particles having an average particle diameter of at least 1 nm and at most 100 nm, and (a1c) an organic compound capable of being adsorbed on the surface of the metal particles and (a2) drying the water or organic solvent, (b) contains the organic compound, (c) has an apparent density of at least 1.0 g/ml and at most 5.0 g/ml, and (d) contains water with a content of at least 0.1 wt % and at most 1.5 wt %. According to an aspect of the present invention, the present invention offers a granular metal powder that (a) comprises (a1) metal particles having an average particle diameter of at least 1 nm and at most 100 nm and (a2) an organic compound capable of being adsorbed on the surface of the metal particles, (b) has an apparent density of at least 1.0 g/ml and at most 5.0 g/ml, and (c) contains water with a content of at least 0.1 wt % and at most 1.5 wt %. The granular metal powder of the present invention is not a colloidal solution, can be handled as a powder, and can be redispersed in water, an organic solvent, or a mixture of them when it is used.

When the granular metal powder contains the organic compound with a content of at least 0.1 wt % and at most 20 wt % in terms of carbon content, the powder has particularly good dispersibility in water, an organic solvent, or a mixture of them.

When the metal particles are composed of (a) a metal selected from the group consisting of Cr, Mn, Fe, Co, Ni, Cu, Zn, Mo, Ru, Rh, Pd, Ag, Sn, W, Ir, Pt, and Au when expressed as the symbol of elements, (b) an alloy of the metal, or (c) a metal composite of the metal, the effect of the metal particles becomes particularly noticeable.

The granular metal powder of the present invention is a dried granular material. Consequently, in comparison with conventional colloidal materials, the powder not only is superior in handling but also can be more readily redispersed. As a result, the powder is advantageous in that its amount can be easily controlled when it is added to another material, such as resin and adhesive, to form a composite material and that it can be used without paying attention, for example, to the selection of the compatibility with the dispersion medium.

BEST MODE FOR CARRYING OUT THE INVENTION

The present invention offers a granular metal powder composed mainly of metal particles having an average particle diameter of at least 1 nm and at most 100 nm. As described above, as the particle diameter of the metal particles is decreased to a nanometer size, the agglomerative force between the particles generally becomes strong. Consequently, when the metal particles of a nanometer size are used, it is necessary to use the metal particles either in the form of colloidal particles as in the prior art or in the form of dry granules as in the present invention.

The particles may take any shape in addition to a sphere, such as a spheroid, a flat body, a scale, pointed sugar candy balls and other odd forms, and an indefinite form. Furthermore, the particles may be a mixture of particles having different shapes. The average particle diameter of metal particles and that of a granular metal powder can be obtained by using a scanning electron microscope (SEM) or another direct observation method to calculate an average value of the diameters of at least 30 particles or so. In this case, when the shape of the metal particles is not spherical, the length of the longest side of the particle is specified as the particle diameter. In addition, as needed, in place of the direct observation method, a known particle-size distribution meter based on the laser diffraction method or another method may also be used to obtain the average particle diameter.

A granular metal powder is useful when it has an apparent density of at least 1.0 g/ml and at most 5.0 g/m.

If the apparent density is less than 1.0 g/ml, the granular metal powder contains a large number of voids therein, and therefore it may readily break from these voids. Consequently, it is necessary to handle it carefully. Furthermore, it readily flies, making it difficult to weigh. Conversely, if the apparent density is more than 5.0 g/ml, the granular metal powder contains almost no voids therein. As a result, it becomes resistant to break. Consequently, the osmosis of a solvent is suppressed, and the redispersibility of the metal powder is decreased.

In addition, it is desirable that the granular metal powder have a particle diameter of at least 1 μm and at most 100 μm while its apparent density is lying in the foregoing range. The reason is that if the particle diameter is less than 1 μm, even when an external force is applied to the granular metal powder, it does not break readily. As a result, the redispersibility of the metal powder in a solvent is decreased. Conversely, if the particle diameter is more than 100 μm, it takes a long time to break the granular metal powder by a solvent. As a result, the redispersibility of the granular metal powder in a solvent is decreased in effect.

In addition, it is desirable that the granular metal powder contain an organic compound with a content of at least 0.1 wt % and at most 20 wt % in terms of carbon content. The reason is that if the content is less than 0.1 wt %, the frictional resistance between the fine metal particles of a nanometer size becomes large, decreasing the action of slipping. Thus, the redispersibility is decreased. Conversely, if the content is more than 20 wt %, the organic compound acts as a caking agent between the fine metal particles of a nanometer size. As a result, contrary to the intention, the redispersibility is decreased.

Any organic compound may be used as the organic compound to be contained in the granular metal powder providing that the organic compound can be adsorbed on the surface of the metal particles. In particular, it is desirable that the organic compound contain a polar-group-forming element, such as 0, N, and S, at the main chain or modifying group in the structure. More specifically, the types of the organic compound include organic compounds having a carboxyl group, amino group, nitro group, quaternary ammonium group, hetrocyclic group having a basic nitrogen atom, and functional group such as a sulfonic group. In addition, even an organic compound containing no polar-group-forming element, such as O, N, and S, at the main chain or modifying group in the structure can be used as a suitable compound providing that it has a functional group superior in the affinity and adsorbability to metal atoms. More specifically, the types of the functional group include a phenyl group, lauryl group, and stearyl group.

In addition, it is desirable that the granular metal powder contain water with a content of at least 0.1 wt % and at most 1.5%. The reason is that if the water content is less than 0.1 wt %, the frictional resistance between the metal particles becomes large, decreasing the action of slipping. Thus, the redispersibility is decreased.

The upper limit of the water content is the limit of the amount that can avoid a phenomenon that the granular metal powder agglomerates due to the presence of water. The upper limit is determined to be 1.5 wt % according to experimental results. If the water content is more than 1.5 wt %, the granular metal powder agglomerates due to the presence of water and its handling becomes difficult.

It is desirable that the granular metal powder of the present invention have a metal constituent composed of a metal selected from the group consisting of Cr, Mn, Fe, Co, Ni, Cu, Zn, Mo, Ru, Rh, Pd, Ag, Sn, W, Ir, Pt, and Au when expressed as the symbol of elements, an alloy thereof, or a metal composite thereof. When the content of an unavoidably included ionic impurity is in a range of at most 1 wt %, the granular metal powder does not show notable variations in the property.

The production method for the above-described granular metal powder has no special limitation providing that the granular metal powder has the physical property that satisfies the foregoing specification. An example able production method is explained below. First, metal particles are prepared that have an average particle diameter of at least 1 nm and at most 100 nm. The metal particles are dispersed in a medium such as water, an organic solvent, or a mixture of them to produce a suspension liquid. The suspension liquid undergoes a drying process employing the spray-drying method or freeze-drying method. In a state before the drying, water exists between the metal particles having an average particle diameter of at least 1 nm and at most 100 nm. During the drying process, the water evaporates rapidly, producing proper voids between the metal particles. Thus, a granular metal powder having suitable apparent density can be obtained. In this case, to produce proper voids at the time of drying, it is particularly desirable that the suspension liquid have a solid-content concentration of at least 5 wt % and at most 75 wt %.

The organic compound to be contained in the granular metal powder may be added to the suspension liquid or be supplied, for example, as a surface coating to the metal particles having an average particle diameter of at least 1 nm and at most 100 nm. The foregoing methods may also be combined.

EMBODIMENT

The present invention is not to be limited by the following examples.

Example 1

(Samples 1 to 4: the Suspension-liquid Concentration)

A water-matrix suspension liquid was prepared in which spherical silver particles having an average particle diameter of 20 nm were suspended and the resin of polyvinylpyrrolidone (abbreviated as PVP) was contained. The concentration of the metal particles was varied to obtain four different samples, which are Samples 1 to 4. Table I shows the features of them.

The water-matrix suspension liquids were dried by using a spray drier under the following conditions to obtain four types of granular metal powders: an inlet temperature of 180° C., a feeding amount of the suspension liquid of 2.0 kg/h, and a revolution number of the atomizer disk of 30,000 rpm.

A specimen of 100 g was sampled from each of the obtained granular metal powders, and the apparent density was obtained by measuring the apparent volume using a measuring cylinder. The results are shown in Table I. As can be seen from the results, Sample 2, whose suspension-liquid concentration was 85 wt %, and Sample 4, whose suspension-liquid concentration was 2 wt %, failed to fall within the range of the specification of the present invention. In particular, the powder of Sample 4 floated lightly, making the handling of it difficult, for example, at the time of weighing.

A part of the obtained granular metal powder was observed under an optical microscope (magnification 100× to 500×). The average particle diameter of 30 particles is shown in Table I.

Another part of the granular metal powder was sampled to measure it by the LECO method (in which an organic substance is burned to measure the produced gas with infrared absorption). The results on Samples 1 to 4 are shown in Table I.

Another specimen of 100 g was sampled from each of the granular metal powders to be placed in a vacuum drier. After being placed stationarily for 24 hours at a temperature of 80° C., the specimen was subjected to a weight measurement. By using the weights before and after the placement, the amount of water contained in the granular metal powder was obtained. Samples 1 to 4 showed the same result of 0.8 wt %.

Yet another specimen of 100 g was sampled from each of the obtained four granular metal powders to evaluate the redispersibility. The specimen was added to 100 g of water to be agitated with a magnetic stirrer for 10 minutes at 50 rpm. Sample 4 floated on the water, and it was impossible to agitate it. Consequently, no evaluation was given. The remaining samples were evaluated as follows. After the agitation, when the bottom portion in the beaker was visually inspected, a sample having a sediment is judged to be D (unsatisfactory) and a sample having no sediment to be C. When left standing under the same condition, a sample producing no sediment is judged to be B. After samples are left standing for 24 hours, when the same observation is performed, a sample producing no sediment is judged to be A. Samples 1 and 3 produced no sediment after 24 hours. It was confirmed that Sample 2 produced a sediment immediately after the agitation.

The easiness of the handling was evaluated as follows:

a sample that does not fly even in an open environment: A a sample that does not fly in a three-side-surrounded enclosure: B a sample that does not fly in a hood: C a sample that flies even in a hood: D (unsatisfactory).

TABLE I

| Sample No. | suspension-liquid concentration (wt %) | Apparent density (g/ml) | Particle diameter of granular metal powder (μm) | organic-substance content (wt % in terms of C) | Water content (wt %) | Easiness of handling | Redispersibility |
|---|---|---|---|---|---|---|---|
| 1 | 50 | 3.5 | 55 | 3.5 | 0.8 | A | A |
| 2 | 85 | 5.5 | 48 | 3.4 | 0.8 | B | D |
| 3 | 10 | 1.2 | 60 | 3.5 | 0.8 | B | A |
| 4 | 2 | 0.8 | 70 | 3.6 | 0.8 | D | — |

Note:
Redispersibility of Sample 4 could not be evaluated.

Example 2

(Samples 5 to 8: the Number of Revolutions of the Atomizer Disk)

A water-matrix suspension liquid was prepared in which spherical silver particles having an average particle diameter of 85 nm were contained. The water-matrix suspension liquid was spray-dried under four different conditions in which the number of revolutions of the atomizer disk was varied at the time of spray drying. Samples 5 to 8 were produced by the four different conditions.

Samples 5 to 8, which are the obtained granular metal powders, were subjected to the evaluation for the same items as in Example 1 through the same evaluation method. The results are summarized in Table II.

As can be seen from the results shown in Table II, the number of revolutions of the atomizer disk effectively affects the average particle diameter of the granules of the obtained granular metal powder. In particular, Sample 5, for which the number of revolutions is high, suffers a reduction in the redispersibility because of the decrease in the average particle diameter of the granular metal powder. Sample 8, for which the number of revolutions is low, also suffers a reduction in the redispersibility because of the increase in the average particle diameter of the granular metal powder.

TABLE II

| Sample No. | Number of revolutions of atomizer disk (rpm) | Apparent density (g/ml) | Particle diameter of granular metal powder (μm) | organic-substance content (wt % in terms of C) | Water content (wt %) | Easiness of handling | Redispers-ibility |
|---|---|---|---|---|---|---|---|
| 5 | 50,000 | 2.2 | 0.6 | 1.5 | 0.5 | A | C |
| 6 | 30,000 | 2.0 | 1.5 | 1.4 | 0.5 | A | A |
| 7 | 5,000 | 2.3 | 85 | 1.5 | 0.6 | A | A |
| 8 | 2,000 | 2.1 | 120 | 1.5 | 0.5 | A | C |

Example 3

(Samples 9 to 12: the Feeding Amount of the Suspension Liquid at the Time of Spray Drying)

A water-matrix suspension liquid was prepared in which spherical silver particles having an average particle diameter of 6 nm were contained. The water-matrix suspension liquid was spray-dried under four different conditions in which the feeding amount of the suspension liquid was varied at the time of spray drying. Samples 9 to 12 were produced by the four different conditions.

Samples 9 to 12, which are the obtained granular metal powders, were subjected to the evaluation for the same items as in Example 1 through the same evaluation method. The results are summarized in Table III.

TABLE III

| Sample No. | Feeding amount of suspension liquid (kg/h) | Apparent density (g/ml) | Particle diameter of granular metal powder (μm) | organic-substance content (wt % in terms of C) | Water content (wt %) | Easiness of handling | Redispers-ibility |
|---|---|---|---|---|---|---|---|
| 9 | 2.0 | 3.8 | 55 | 6.2 | 0.8 | A | B |
| 10 | 0.1 | 3.8 | 60 | 6.0 | 0.05 | A | C |
| 11 | 3.0 | 3.6 | 55 | 6.0 | 0.15 | A | B |
| 12 | 5.0 | 3.8 | 58 | 6.2 | 1.5 | C | B |

As can be seen from Table III, Sample 10 is slightly inferior in redispersibility because the water content in the produced granular metal powder is low. Nevertheless, it can be used. Sample 12, for which the water content in the produced granular metal powder is slightly high, has a slight tendency to agglomerate, so that it cannot give a smooth powdery feeling.

Example 4

(Samples 13 to 16: the Organic-Substance Content)

Four types of water-matrix suspension liquids were prepared that contained spherical silver particles having an average particle diameter of 50 nm and that had different resin concentrations. The resin used was PVP. These samples were spray-dried to produce granular metal powders. They are referred to as Samples 13 to 16.

Samples 13 to 16, which are the obtained granular metal powders, were subjected to the evaluation for the same items as in Example 1 through the same evaluation method. The results are summarized in Table IV.

As can be seen from Table IV, Sample 13, which was low in organic-substance content, had a tendency to be insufficient in adhesion by the resin. As a result, it was observed that part of it had a tendency to turn into fine particles at the time of handling. In addition, in the evaluation of redispersibility, fine particles sticked to one another strongly and therefore the dispersion was insufficient. On the other hand, Sample 16, which was high in resin content, had no problem in handling. However, it required a long agitation time in the evaluation test of redispersibility because the resin took a long time to dissolve.

TABLE IV

| Sample No. | Apparent density (g/ml) | Particle diameter of granular metal powder (μm) | organic-substance content (wt % in terms of C) | Water content (wt %) | Easiness of handling | Redispers-ibility |
|---|---|---|---|---|---|---|
| 13 | 3.6 | 60 | 0.03 | 0.8 | C | C |
| 14 | 3.8 | 51 | 0.12 | 0.8 | A | B |
| 15 | 3.8 | 68 | 18.0 | 0.8 | A | B |
| 16 | 3.9 | 55 | 21.5 | 0.8 | A | C |

Example 5

(Samples 17 to 19: Change in Types of Metal Particles: a First Change)

Tetradecane-matrix suspension liquids were prepared that contained spherical gold particles having an average particle diameter of 80 nm and that had different solid-content concentrations. The suspension liquids contained polyvinyl alcohol (PVA). The suspension liquids were spray-dried to produce granular metal powders. Thus, Samples 17 to 19 were produced.

Samples 17 to 19, which are the obtained granular metal powders, were subjected to the evaluation for the same items as in Example 1 through the same evaluation method. The results are summarized in Table V.

TABLE V

| Sample No. | suspension-liquid concentration (wt %) | Apparent density (g/ml) | Particle diameter of granular metal powder (μm) | organic-substance content (wt % in terms of C) | Water content (wt %) | Easiness of handling | Redispersibility |
|---|---|---|---|---|---|---|---|
| 17 | 50 | 3.0 | 80 | 3.0 | 0.8 | A | A |
| 18 | 85 | 5.5 | 66 | 3.1 | 0.8 | B | D |
| 19 | 10 | 0.8 | 74 | 3.0 | 0.8 | D | — |

As can be seen from Table V, Sample 18, which had high apparent density, had high agglomerative force at the time of redispersion. As a result, it became resistant to disperse as fine particles, and the presence of a sediment was found after the agitation. On the other hand, Sample 19, which had low apparent density, had a tendency to float at the time of handling as a granular metal powder, making it difficult, for example, to weigh. At the time of the evaluation test of redispersibility, also, it floated on the water, and therefore it was impossible to disperse it.

Example 6

(Samples 20 to 22: Change in Types of Metal Particles: a Second Change)

An ethyl alcohol-matrix suspension liquid was prepared that contained spherical alloy particles having an average particle diameter of 10 nm and that had a solid-content concentration of 35 wt %. The alloy was composed of 70 wt % Ag and 30 wt % Pd. The suspension liquid contained PVP. The suspension liquid was spray-dried to produce granular metal powders. Thus, Samples 20 to 22 were produced.

Samples 20 to 22, which are the obtained granular metal powders, were subjected to the evaluation for the same items as in Example 1 through the same evaluation method. The results are summarized in Table VI.

TABLE VI

| Sample No. | Feeding amount of suspension liquid (kg/h) | Apparent density (g/ml) | Particle diameter of granular metal powder (μm) | organic-substance content (wt % in terms of C) | Water content (wt %) | Easiness of handling | Redispersibility |
|---|---|---|---|---|---|---|---|
| 20 | 2 | 1.8 | 54 | 2.5 | 0.6 | B | A |
| 21 | 0.1 | 1.8 | 60 | 2.5 | 0.05 | B | C |
| 22 | 2 | 0.8 | 125 | 2.6 | 0.6 | B | — |

As can be seen from Table VI, Sample 20 can be used without problems in the easiness of handling and the redispersibility. Sample 21, which had low water content, started to produce a sediment when left standing at the time of the evaluation of redispersibility.

Sample 22, which had low apparent density, had a granular metal powder having large particle diameter. As a result, although it created no particular problem in handling, it floated on the water at the time of the evaluation test of redispersibility, and therefore it was impossible to carry out the test.

INDUSTRIAL APPLICABILITY

A granular metal powder of the present invention can be stored stably over a longer period than that allowed by the storing of a nanometer-size fine metal powder in a colloidal state. It can be used without paying attention to the restriction of the solvent. Consequently, it had a wide range of applications for materials in the future that need a nanometer-size fine metal powder.

We claim:

1. A granular metal powder that:

(a) is produced by the steps of:

(a1) preparing a solution comprising:

(a1a) a medium selected from the group consisting of water, an organic solvent, and a mixture of them;

(a1b) metal particles having an average particle diameter of at least 1 nm and at most 100 nm, the metal particles being composed of a metal selected from the group consisting of Ag, Au and an alloy of each of Ag and Au; and (a1c) an organic compound capable of being adsorbed on the surface of the metal particles; and (a2) drying a medium selected from the group consisting of the water and the organic solvent;

(b) contains the organic compound, (c) has an apparent density of at least 1.0 g/ml and at most 5.0 g/ml; and (d) contains water with a content of at least 0.1 wt % and at most 1.5 wt %.

2. A granular metal powder as defined by claim 1, the granular metal powder having a particle diameter of at least 1 μm and at most 100 μm.

3. A granular metal powder as defined by claim 1, the granular metal powder containing the organic compound with a content of at least 0.1 wt % and at most 20 wt % in terms of carbon content.

4. A granular metal powder that:

(a) comprises:

(a1) metal particles having an average particle diameter of at least 1 nm and at most 100 nm; the metal particles being composed of a metal selected from the group consisting of Ag, Au and an alloy of each of Ag and Au; and (a2) an organic compound capable of being adsorbed on the surface of the metal particles;

(b) has an apparent density of at least 1.0 g/ml and at most 5.0 g/ml; and (c) contains water with a content of at least 0.1 wt % and at most 1.5 wt %.

5. A granular metal powder as defined by claim 4, the granular metal powder having a particle diameter of at least 1 μm and at most 100 μm.

6. A granular metal powder as defined by claim 4, the granular metal powder containing the organic compound with a content of at least 0.1 wt % and at most 20 wt % in terms of carbon content.

* * * * *